United States Patent [19]
Mori et al.

[11] 3,931,136
[45] Jan. 6, 1976

[54] CATALYTIC PRODUCTION OF A HIGH MOLECULAR WEIGHT CIS-1,4-POLYISOPRENE

[75] Inventors: Kan Mori, Kawasaki; Hiroharu Ikeda, Yokohama; Isao Nagaoka; Tooru Shibata, both of Yokkaichi; Sigeo Kawatani, Nishinomiya; Tatsuhiko Kikuchi, Kawasaki, all of Japan

[73] Assignee: Japan Synthetic Rubber Co., Ltd., Tokyo, Japan

[22] Filed: May 23, 1974

[21] Appl. No.: 472,632

Related U.S. Application Data

[63] Continuation-in-part of Ser. No. 26,105, April 6, 1970, abandoned.

[52] U.S. Cl............................. 260/94.3; 450/666
[51] Int. Cl.² .................... C08D 1/14; C08D 3/12
[58] Field of Search.................. 260/94.3; 450/666

[56] References Cited
UNITED STATES PATENTS

| | | | |
|---|---|---|---|
| 2,881,156 | 4/1959 | Pilar et al. | 260/94.9 |
| 3,036,056 | 5/1962 | Rion | 260/94.7 |

FOREIGN PATENTS OR APPLICATIONS

| | | | |
|---|---|---|---|
| 1,164,096 | 2/1964 | Germany | 260/94.3 |

*Primary Examiner*—William F. Hamrock
*Attorney, Agent, or Firm*—Sherman & Shalloway

[57] ABSTRACT

High molecular weight cis-1,4-polyisoprene is produced by contacting isoprene with a catalyst formed by admixing (A) a titanium tetrachloride, (B) a trihydrocarbylaluminum and (C) a beta-diketone. The activity of this ternary catalyst is not adversely affected by such impurities as cyclopentadiene that are contained in the feed stock isoprene.

2 Claims, No Drawings

CATALYTIC PRODUCTION OF A HIGH MOLECULAR WEIGHT CIS-1,4-POLYISOPRENE

This application is a continuation-in-part of application Ser. No. 26,105 filed April 6, 1970 now abandoned.

This invention relates to an improved process for producing commercially advantageously high molecular weight cis-1,4-polyisoprene in good yield as well as to a new ternary catalyst for use in such process. More particularly, the invention relates to a process wherein in producing high molecular weight cis-1,4-polyisoprene by bringing isoprene into contact with a polymerization catalyst under an inert atmosphere the catalyst used is characterized by being a three-component mixture of (A) a titanium tetrachloride, (B) an organoaluminum compound of the formula $AlR_3$, where each R is either alkyl, preferably $C_1$–$C_8$ alkyl, aryl, preferably phenyl, or cycloalkyl, preferably cyclohexyl, and (C) a beta-diketone of the formula

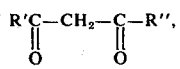

where R' and R", which may be the same or different, are either alkyl, preferably $C_1$–$C_5$ alkyl or aryl, preferably phenyl.

It was found that the foregoing catalyst according to the present invention has a very unique property not only in that it has the activity of effecting the polymerization of pure isoprene at a high efficiency to yield 1,4-cis-polyisoprene but also in that this activity is not particularly affected adversely by such impurities as cyclopentadiene which are usually present in commercial isoprene.

It is well known from the disclosures of such, for example, as Belgian Pat. No. 543,292 (1955) that the Ziegler catalyst consisting of titanium tetrachloride and trialkylaluminum catalyzes the formation of cis-1,4-polyisoprene from isoprene. However, in polymerizing isoprene in the presence of the Ziegler catalyst, the cyclopentadiene contained in the isoprene feed stock greatly impaire the polymerization activity of the catalyst. A cyclopentadiene content of less than 100 ppm, e.g., several tens of ppm, as shown in the hereinafter given control experiments, cause a decrease in the activity of the conventional Ziegler catalyst to a low value of such as one-half to one-fourth. On the other hand, the commercial isoprene that is presently being produced by various processes usually contain a substantial amount of cyclopentadiene as a impurity. Hence, heretofore, in producing cis-1,4-polyisoprene it was necessary for ensuring the maintenance of the activity of the catalyst to reduce the cyclopentadiene content of the isoprene feed stock used to the order of not more than several ppm by removing the cyclopentadiene in advance of the use of the isoprene feed stock in the polymerization process. However, for carrying out the purification of isoprene to such a high degree, precise fractionation using a distillation column of a great number of theoretical plates or the carrying out of special chemical treatments was a necessity. It goes without saying that a purification treatment of this kind brings about a rise in the cost of the feed stock isoprene to unfavorably affect the process in carrying it out economically on a commercial basis.

In contrast, the invention catalyst possesses the property that its activity does not demonstrate a marked decrease by the presence of cyclopentadiene in amounts up to about 100 ppm. Thus, even in the case of isoprene containing a considerable amount of cyclopentadiene, it can be effectively used as the polymeric starting material after having reduced its cyclopentadiene content to an amount below 100 ppm by means of the usual simple fraction distillation technique or other appropriate treatments. For example, as shown in the hereinafter given examples, the activity of the invention catalyst decreases only several percent even when impure isoprene containing 40 ppm of cyclopentadiene is used instead of pure isoprene whose cyclopentadiene content is substantially zero ppm. Thus the invention catalyst is fully satisfactory for practical use. The use of such inexpensive isoprene as the feed stock is of great significance from the standpoint of commercial economy.

The most characteristic component of the invention catalyst is the beta-diketone, the component (C). It was truly surprising as well as unexpected that this beta-diketone component when used conjointly with a titanium tetrachloride, component (A), and an organoaluminum compound, component (B), would provide a high polymerization activity in polymerizing isoprene and, in addition, have the property that the activity of the catalyst would not be adversely affected by the impurity, cyclopentadiene. This effect cannot be obtained by the use of carbonyl compounds other than the beta-diketone as component (C). For example, a compound having a carbonyl group in its molecule but not a beta-diketone, e.g. acetone or acetoin, when used as component (C), provides a catalyst whose activity decreases to less than one-half its initial value upon the presence of 40 ppm of cyclopentadiene in the isoprene. Further, the activity of the catalyst which uses in combination an alcohol, e.g. ethanol or octyl alcohol, frequently used as a modifier of the organoaluminum component of the Ziegler catalysts, decreases to a value one-fourth to one-third of the initial value even when the amount present of the cyclopentadiene is 30 ppm. these results will be shown in the hereinafter given control experiments.

The embodiments of the present invention will be more fully described hereunder. The catalyst of the present invention consists of components (A), (B) and (C). Component (B) is an organoaluminum compound of the formula $AlR_3$, where each R is either alkyl, aryl or cycloalkyl; specific examples including trimethylaluminum, triethylaluminum, tripropylaluminum, triisobutylaluminum, trihexylaluminum, triphenylaluminum, and tricyclohexylaluminum. Component (C) is a beta-diketone of the formula $R'CO.Ch_2.CO.R''$, which may be the same or different, are each either alkyl or aryl. Specific examples include acetylacetone, propionylacetone, butyrylacetone, isobutyrilacetone, caproylacetone, benzoylacetone and dibenzoylmethane; of which acetylacetone is to be most preferred.

While the molar ratio of components (A) and (B) in the catalyst will vary depending upon the amount of component (C), usually a ratio of component (A) to component (B) ranging from 0.1:1 to 2:1, and preferably from 0.2:1 to 1:1, is chosen. The molar ratio of component (B) to component (C), which is of especial importance, ranges from 1:0.05 to 1:0.7, and preferably 1:0,1 to 1:0.5. If component (C) is used in an amount less than 0.05 mol per mol of component (B), the hoped-for results cannot be fully demonstrated. On the other hand, if 0.7 mol is exceeded, there is a tendency to a decrease in the activity of the catalyst.

The catalyst of the present invention is prepared by mixing first components (B) and (C) and then adding component (A) thereto. The mixing is preferably carried out in an inert organic solvent. As such an inert organic solvent, mention can be made of such, for example, as the aromatic hydrocarbons as benzene and toluene and the aliphatic hydrocarbons as hexane and heptane. After having mixed the three components, the mixture is preferably aged for a while. The aging time differs depending on the aging temperature. Usually a shorter aging time is sufficient under higher temperatures. For example, at 10°C. approximately an hour's aging is preferred, but at 20°C. or higher, 30 minutes' aging is sufficient. The mixing of the catalyst components can also be carried out in the presence of a part or all of the isoprene to be polymerized.

The polymerization of isoprene is carried out by contacting the isoprene with the hereinbefore described catalyst in an inert organic solvent or in the absence of the solvent. As the inert organic solvents that are usable, included are those hydrocarbons mentioned hereinbefore in connection with the preparation of the catalyst.

The preparation of the catalyst and the polymerization operation are all carried out under an atmosphere of an inert gas. The inert gas used is, for example, either nitrogen or argon.

The polymerization reaction temperature is imposed with no special restriction, but usually a range between −30°C. and +80°C. is chosen. Again, the reaction pressure is neither restricted in particular, and a pressure sufficient to maintain the reaction mixture in a liquid phase will do. After the polymerization reaction has proceeded to the desired stage, the reaction is terminated by a conventional method, e.g., by the addition of either oxygene-free methanol or isopropanol, followed by separation, washing and drying of the resulting polymer to obtain the intended polyisoprene. The reaction can be carried out either batchwise or continuously, as well as in accordance with the various modified modes of manufacturing polyisoprene known to the art.

The polyisoprene obtained by the present invention is a high molecular weight polymer, in which the cis-1,4-structure accounts for at least 96 % of the polymer, and its inherent viscosity [$\eta$] as measured at 30°C. in toluene is usually 3–8.

The following examples and control experiments are given for further illustration of the invention.

EXAMPLES 1 – 4

These examples illustrate the effect of the content of cyclopentadiene in the feed stock isoprene on the polymer yield.

A catalyst was prepared in the following manner. A flask thoroughly purged with nitrogen was charged with 12 ml. of a 0.5 mol per liter toluene solution of triethylaluminum ($AlEt_3$), after which 2.4 ml. of a 0.5 mol per liter toluene solution of acetylacetone were added with stirring at 0–5°C., followed by holding the reaction mixture at 10°C. for 10 minutes. After cooling the contents of the flask at from −50° to −40°C., 10 ml. of a 0.5 mol per liter toluene solution of $TiCl_4$ were added, followed by stirring for 60 minutes at 10°C., thus obtaining the catalyst.

A 300-ml. pressure glass reactor thoroughly purged with nitrogen was charged with 160 ml. of hexane, 40 ml. (27.2 g) of pure isoprene and a 0.0000272 gram per milliliter hexane solution of cyclopentadiene in the amount prescribed, after which 2.0 ml. of the foregoing catalyst mixture [molar ratio of isoprene: Ti=1000] were added, the reactor was closed, and the polymerization reaction was carried out for 5 hours at 20°C.

After completion of the reaction, the reaction was terminated by the addition of isopropyl alcohol containing p-tert.-butyl catechol as the antioxidant. This was followed by introducing the reaction mixture into a large quantity of methanol to precipitate the resulting polymer. The precipitated polymer was then isolated, washed and vacuum dried overnight at 45°C. The microstructure of the so obtained polyisoprene was 98.6 % cis-1,4 bonds and 1.4 % 3,4 bonds. The results of the polymerization are shown in Table 1. As can be seen from these results, the invention catalyst not only provides high yields but also is not adversely affected as to its activity by the presence of cyclopentadiene.

Table 1

| Example | Cyclopentadiene (ppm) | Yield of Polyisoprene(%) | [$\eta$] |
| --- | --- | --- | --- |
| 1 | 0 | 98 | 3.8 |
| 2 | 20 | 97 | 4.3 |
| 3 | 40 | 91 | 4.8 |
| 4 | 60 | 80 | 5.1 |

CONTROLS 1– 5

These control experiments are given for illustrating the fact that the control catalysts not containing the beta-diketone component are adversely affected by the presence of cyclopentadiene. In the case of Control 1, except that the molar ratio of Al:Ti chosen was 1.0— that having the highest activity of this catalyst— the experiment was otherwise carried out as in Example 1. On the other hand, in the case of Controls 2–5, the experiments were conducted as in Example 1 except that acetone, acetoin, ethanol and n-octyl alcohol were used instead of acetylacetone. The results obtained are shown in Table 2. As can be seen from the results presented in this table, the control catalyst were affected without exception by the presence of a small quantity of cyclopentadiene.

Table 2

| | | Yield of Polyisoprene (%) Cyclopentadiene Content(ppm) | | |
| --- | --- | --- | --- | --- |
| Control | Catalyst | 0 | 30 | 40 |
| 1 | $TiCl_4$-$AlEt_3$ | 73 | — | 41 |
| 2 | $TiCl_4$-$AlEt_3$-acetone | 82 | — | 41 |
| 3 | $TiCl_4$-$AlEt_3$-acetoin | 75 | — | 28 |
| 4 | $TiCl_4$-$AlEt_3$-ethanol | 87 | 21 | — |
| 5 | $TiCl_4$-$AlEt_3$-n-octylalcohol | 95 | 32 | — |

EXAMPLE 5

This example illustrates the case where triisobutylaluminum was substituted for the triethylaluminum of Example 1.

The polymerization reaction was carried out using triisobutylaluminum instead of triethylaluminum and also changing the aging temperature to 30°C. and polymerization temperature to 50°C., but otherwise as described in Example 1 to form a polymer at a yield of 92 %.

EXAMPLE 6 – 7

These examples illustrate the case where benzoylacetone and dibenzoylmethane were substituted for acetylacetone of Example 1.

The experiments were conducted as in Example 1 except that benzoylacetone and dibenzoylmethane were used instead of acetylacetone. The results obtained are shown in Table 3.

Table 3

| Ex. | Catalyst | Yield of Polyisoprene(%) | [η] |
|---|---|---|---|
| 6 | TiCl$_4$-AlEt$_3$-benzoyl acetone | 86 | 4.9 |
| 7 | TiCl$_4$-AlEt$_3$-dibenzoylmethane | 61 | 4.9 |

EXAMPLE 8

This example was conducted to show the effect of the mode of preparing the catalyst, namely the order of addition of the components, on polymerization.

The catalyst components were as follows:
A. 10 ml. of a 0.5 mol/l solution of TiCl$_4$ in toluene.
B. 12 ml. of a 0.5 mol/l solution of AlEt$_3$ in toluene.
C. 2.4 ml. of a 0.5 mol/l solution of acetylacetone in toluene.

The order of addition of each component was as follows:

| Run | 1st stage mixing (at 0–5°C.) stirring of 10 minutes at 10° | 2nd stage mixing (at –50 to –40°C.) stirring of 60 minutes at 10°C. |
|---|---|---|
| No. 1* | (A) + (C) | +(B) |
| No. 2* | (A) + (B) | +(C) |
| No. 3 | (B) + (C) | +(A) |

*Control

In each Run, the catalyst was prepared in a flask completely purged with nitrogen.

The polymerization was carried out as follows:

A 300 ml. glass reaction vessel purged completely with nitrogen was charged with 160 ml. of hexane and 60 ml. (40.8 g) of purified isoprene, and then 2.0 ml. of said catalyst mixture solution (the molar ratio of isoprene to titanium being 1500:1) was added thereto. Polymerization was conducted twice in each Run. The results were as follows:

| Run | Yield of polyisoprene (%) |
|---|---|
| No. 1 | 54 : 53 |
| No. 2 | 74 : 79 |
| No. 3 | 86 : 87 |

It is apparent from the above results that the catalyst activity varies with the order of addition of the catalyst components, and the catalyst activity is the highest in Run No. 3 according to the present invention.

EXAMPLE 9

Run No. 1 (control) and Run No. 3 (this invention) of Example 8 were repeated except that benzoyl acetone and dibenzoyl methane were respectively used instead of acetylacetone as component (C) of the catalyst. The results were as follows:

| | Yield of polyisoprene (%) | |
|---|---|---|
| | Run No. 1 | Run No. 3 |
| Benzoyl acetone | 49 | 86 |
| Dibenzoyl methane | 37 | 61 |

EXAMPLE 10

Run No. 1 (control) and Run No. 3 (this invention) of Example 8 were repeated except that 4.2 ml. of a 0.5 mol/l solution of acetylacetone (the molar ratio of AlEt$_3$ to acetylacetone being 1:0.35)was used as component (C) of the catalyst. The results were as follows:

| Run No. | Yield of polyisoprene (%) |
|---|---|
| 1 | 47 |
| 3 | 82 |

EXAMPLE 11

Run No. 1 (control) and Run No. 3 (this invention) of Example 8 were repeated except that 13 ml. of a 0.5 mol/l solution of AlEt$_3$ was used as component (B) of the catalyst and 2.6 ml. of a 0.5 mol/l solution of acetylacetone, as component (C) of the catalyst. In other words, the molar ratio of TiCl$_4$ to AlEt$_3$ was 1:1.3. The results obtained were as follows:

| Run No. | Yield of polyisoprene (5) |
|---|---|
| 1 | 51 |
| 3 | 84 |

We claim:

1. In the process for producing at least an 80% yield of high molecular weight high cis-1,4-polyisoprene by contacting isoprene in the presence of cyclopentadiene in amounts up to about 100 ppm. with a polymerization catalyst, the improvement which comprises using as said polymerization catalyst a catalyst consisting of
A. titanium tetrachloride,
B. an organoaluminum compound of the formula $AlR_3$ wherein each R is selected from the group consisting of alkyl, aryl and cycloalkyl radicals, and
C. a beta-diketone of the formula

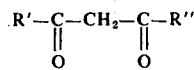

wherein R' and R'' are each independently selected from the group consisting of alkyl and aryl radicals, said catalyst being prepared by mixing first the components (B) and (C) and then adding the component (A) thereto, and the molar ratio of the component (A) to the component (B) being in the range of from 0.1:1 to 2:1, and the molar ratio of the component (B) to the component (C) being in the range of from 1:0.05 to 1:0.7.

2. The process of claim 1 wherein the ratio of component (A) to component (B) is 0.2:1 to 1:1, and the ratio of component (B) to component (C) is 1:0.1 to 1:0.5.

* * * * *

UNITED STATES PATENT OFFICE
CERTIFICATE OF CORRECTION

Patent No. 3,931,136      Dated January 6, 1976

Inventor(s) MORI, ET AL.

It is certified that error appears in the above-identified patent and that said Letters Patent are hereby corrected as shown below:

Please insert priority information to read as follows:

-- April 11, 1969   Japan............69/27698 --

Signed and Sealed this twenty-fifth Day of May 1976

[SEAL]

*Attest:*

RUTH C. MASON
*Attesting Officer*

C. MARSHALL DANN
*Commissioner of Patents and Trademarks*